Dec. 1, 1959 O. J. POUPITCH 2,914,780
METHOD OF ASSEMBLING A WASHER AND ROD TO
MAKE A HEADED FASTENER
Filed July 14, 1955 3 Sheets-Sheet 1
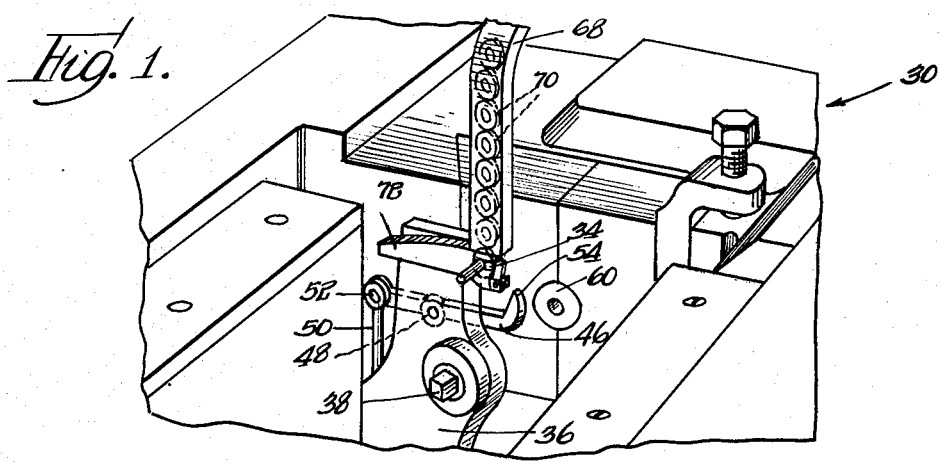
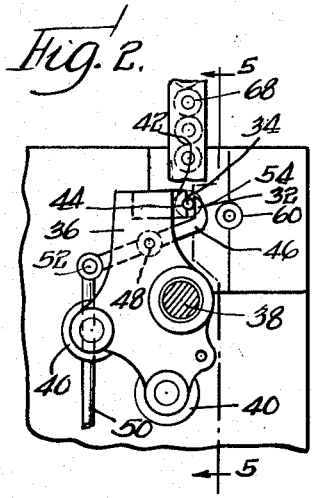
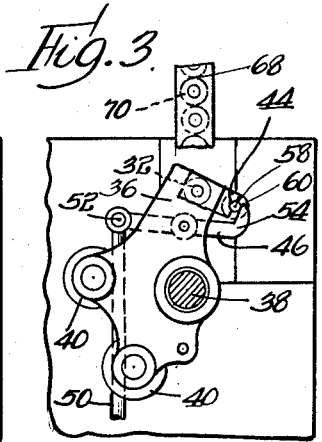
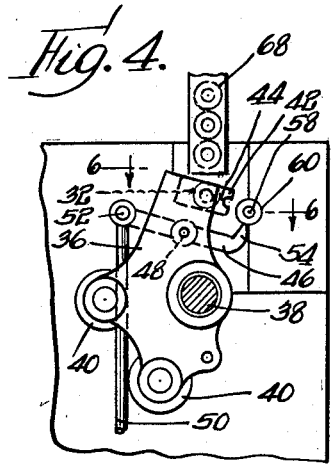
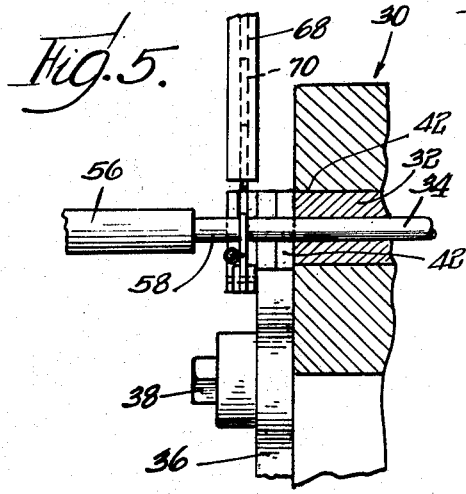
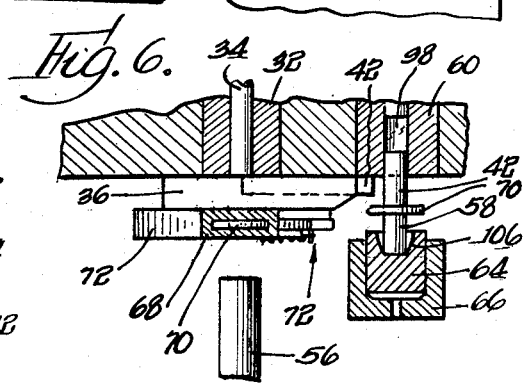
INVENTOR.
Ougljesa Jules
BY: Poupitch
Olson & Trexler
attys

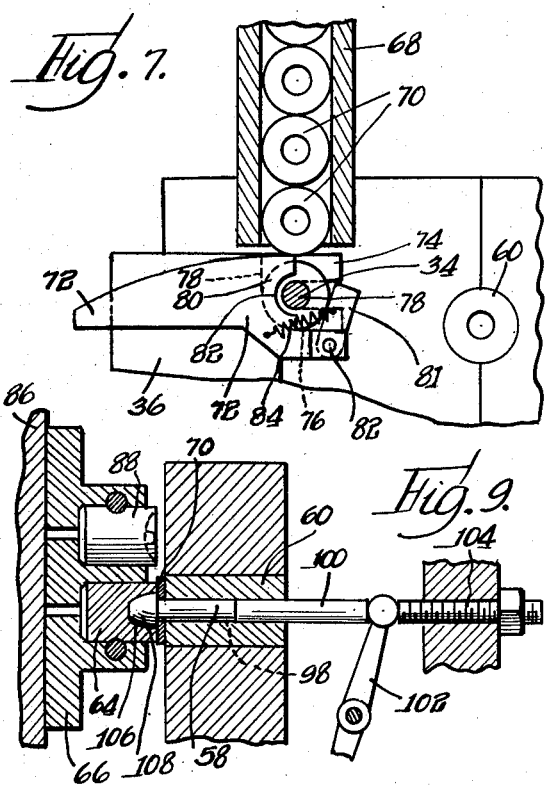

Dec. 1, 1959     O. J. POUPITCH     2,914,780
METHOD OF ASSEMBLING A WASHER AND ROD TO
MAKE A HEADED FASTENER
Filed July 14, 1955     3 Sheets-Sheet 3
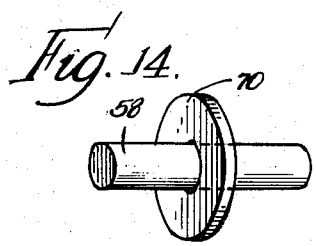
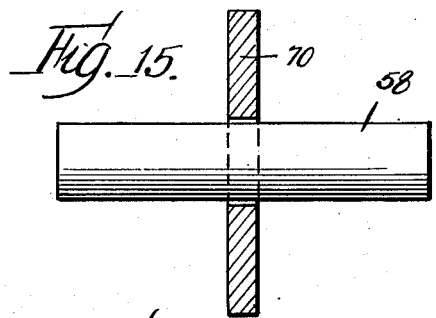
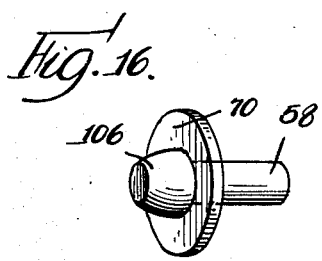
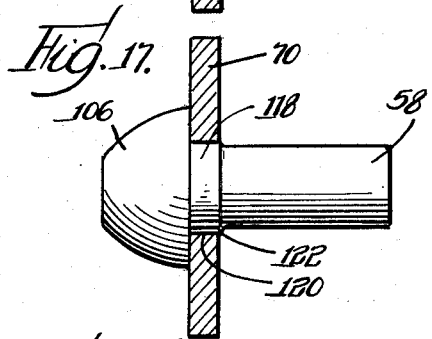
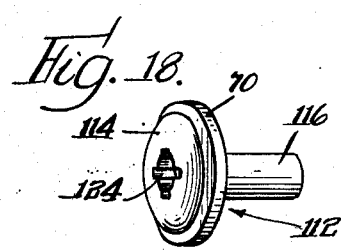
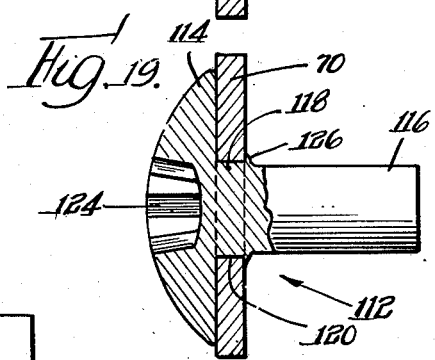
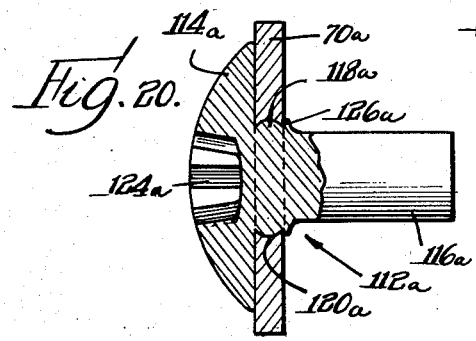
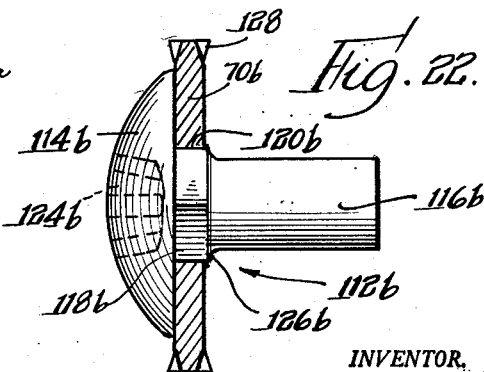
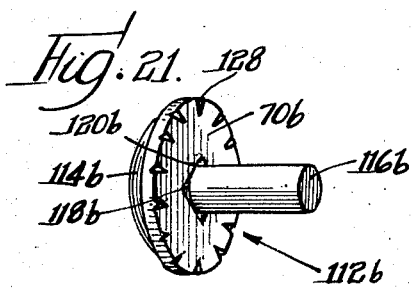
INVENTOR.
Ougljesa Jules
BY   Poupitch
Olson & Trexler United States Patent Office 2,914,780
Patented Dec. 1, 1959

2,914,780

METHOD OF ASSEMBLING A WASHER AND ROD TO MAKE A HEADED FASTENER

Ougljesa Jules Poupitch, Chicago, Ill., assignor to Illinois Tool Works, Chicago, Ill., a corporation of Illinois Application July 14, 1955, Serial No. 522,042

4 Claims. (Cl. 10—27)

This invention is concerned with an improved preassembled fastener device and a method of making the same.

Preassembled screws and washers are now well known in the art. According to the usual practice, the screws or bolts are formed into blanks in a bolt making machine or header, and thereafter are transferred to another machine for assembling with washers. Ultimately, screw threads are rolled on the screw shanks to enlarge the diameter thereof, thereby trapping the washers beneath the heads of the screws. It has been suggested that a washer might be assembled with a blank in a heading machine die for swaging of the blank outwardly beneath the washer as a first step in forming a bolt blank.

It is an object of this invention to improve on the foregoing by providing a method of simultaneously assembling a washer with wire and thereafter severing a blank from the wire and forming a screw or bolt element from the wire with the washer trapped thereon.

It is a further object of this invention to provide a method of assembling a washer with a bolt blank during the process of manufacturing the blank, wherein the washer serves to back up the head during formation thereof and is permanently held on the blank.

A further object of this invention is to provide a method of securing a washer on a bolt shank by means of a uniform peripheral abutment formed incidental to heading during the manufacture of the bolt blank.

It is a more specific object of this invention to provide a method of assembling a washer with the wire stock in a bolt blank in a bolt making machine or header.

Yet another object of this invention is to provide a bolt or screw element having a washer permanently nonrotatably associated therewith by an abutment on the element beneath the plane of the washer.

A further object of this invention is to provide a bolt blank having a washer trapped beneath the head thereof by a uniform peripheral abutment on the shank of the bolt blank below the plane of the washer.

Other and further objects and advantages of the present invention will be apparent from the following description when taken in connection with the accompanying drawings, wherein:

Fig. 1 is a perspective view of a portion of a bolt making machine and the added parts for preassembling washers with the bolts;

Fig. 2 is an elevational view partially in section and with the washer feed track broken away illustrating the shearing off of the wire;

Fig. 3 is a view similar to Fig. 2 at a later time with the parts in a different position of operation;

Fig. 4 is a view similar to Figs. 2 and 3 taken at still a later time with the parts in another position of operation;

Fig. 5 is a vertical sectional view taken substantially along the line 5—5 of Fig. 2;

Fig. 6 is a horizontal sectional view taken substantially along the line 6—6 of Fig. 4;

Fig. 7 is a front elevational view partially in section and with certain parts broken away showing the assembling of the washers with the wire;

Fig. 8 is a view similar to Fig. 7 showing the parts in a different position of operation;

Fig. 9 is a vertical sectional view through the punch and die taken substantially along the line 9—9 in Fig. 10;

Fig. 10 is an elevational view of the oscillating tool holder and punches;

Fig. 11 is a vertical sectional view generally similar to Fig. 9 and taken at a later position of operation substantially along the line 11—11 in Fig. 12;

Fig. 12 is a view similar to Fig. 10 taken at a later time;

Fig. 13 is a cross sectional view generally similar to Figs. 9 and 11 at a later period of operation;

Fig. 14 is a perspective view showing the washer assembled with the cut-off wire;

Fig. 15 is a longitudinal sectional view of the washer and wire shown in Fig. 14;

Fig. 16 is a view similar to Fig. 14 after engagement of the coning punch with the wire;

Fig. 17 is a longitudinal sectional view through the assembly of Fig. 16;

Fig. 18 is a view similar to Fig. 16 following engagement of the finishing punch therewith;

Fig. 19 is a longitudinal sectional view through the assembly of Fig. 18 with a hard washer;

Fig. 20 is a longitudinal sectional view similar to Fig. 19 with a relatively soft washer;

Fig. 21 is a perspective view of a modification of the invention showing a washer with locking teeth and a square center hole; and Fig. 22 is a longitudinal sectional view through the assembly of Fig. 21.

Referring now in greater particularity to the drawings, and first to Fig. 1, there is shown a fragment of a bolt forming machine of the type known as a double stroke header. The machine includes (Figs. 1–6) a shearing die 32 through which wire stock 34 is fed. The wire stock is slightly less in diameter than the desired finished shank diameter of a bolt blank since the diameter is increased somewhat in upsetting the head. The machine also includes a carrier 36 pivotally mounted at 38 on the machine. Cam follower rollers 40 are provided on the carrier for oscillating the carrier from the position shown in Fig. 2 to the position shown in Fig. 3, and back through the position of Fig. 4 to the position shown in Fig. 2.

The carrier 36 carries on its upper arm a shear blade 42. The shear blade 42 is horizontally aligned with the shearing die 32 and is provided at its leading edge with a semi-circular notch 44 of the same diameter as the wire stock 34 and aligned with the central aperture of the shearing die 32 through which the wire is fed.

A gripper finger 46 is pivotally mounted on the carrier at 48 and is controlled by a connecting rod 50 pivotally connected to the end of the finger at 52. The opposite end of the finger is provided with an upturned tip 54 capable of substantial alignment with the shear blade 42 and spaced slightly therefrom.

The wire 34 is fed through the shearing die 32 to a position against a stop 56 (Figs. 5 and 6). The movement of the wire stock then stops, and the carrier is pivoted to carry the shear blade slowly across the face of the die 36 to shear off a section of wire or workpiece 58. It will be apparent from Fig. 2 that the wire in being fed through the die 32 is fed into the notch or groove 44 of the shearing blade. After the wire 34 has been arrested by the stop 56, the finger 46 is moved to the position shown in Fig. 2 in which the upturned end 54 of the finger clamps the wire section 58 against the shearing blade. As the section 58 is moved by the shearing blade and gripper finger, it is carried into alignment with a die 60. A coning tool or cone punch 64 (Fig. 6) carried by an oscillating tool holder 66 then moves up to engage the end of the wire section 58 to force the wire section into the die 60, the finger 46 being pivoted downwardly away from the section 58 and the shear blade 42 retracting with the carrier 36 during the movement of the blank or section 58 into the die as urged by the coning tool or punch.

In addition to the foregoing parts, which are more or less conventional in headers or bolt making machines, there is provided a washer feed chute 68 (Figs. 1–8) down which a plurality of washers 70 is fed, conveniently by gravity. The top of the carrier 36 is cut off so that it may pass below the bottom of the washer chute 68, and the carrier is provided with a washer holding fixture 72. The fixture 72 comprises a plate or bar held by the carrier 36 and provided with a recess to accept the washers, the recess being defined by a back surface 74, a bottom wall 76, an end wall 78, and a wall 80 parallel to the wall 74 and spaced therefrom. The wall 80 is provided with a generally semi-circular recess 82 to provide clearance for the wire 34 as it is fed through the shearing die, and the back surface 34 is provided with a horizontal recess 78 to provide clearance for the wire as it is fed through the shearing die, and also to provide clearance as the washer holding fixture 72 is withdrawn from the forming die 60. The washer holding fixture additionally includes a washer clamp 81 pivotally mounted at 82 and held in a generally upright position by a spring 84. Thus, a washer is dropped into the washer holding fixture 72 and is held in place therein by the finger 81 as the wire 34 is fed past the shear blade and through the washer 70. Accordingly, as the wire is carried over toward the forming die 60, the washer 70 has been telescoped with the cut-off section or blank 58 and is carried therewith to the forming die. It will be understood that the top of the carrier 36 passes beneath the washer feed chute 68 as the cut-off wire section 58 and telescoped washer 70 are moved to the forming die 60, whereby the carrier supports the remaining washers in the chute.

The coning punch or tool 64 previously referred to, and the oscillating tool holder 66 also referred to, are mounted on a reciprocating carriage 86 (Figs. 9, 10 and 12). The oscillating tool holder is pivotally mounted on the carriage 86 and also carries a finishing tool or punch 88. The oscillating tool holder is oscillatably mounted at 90 on the carriage 86 for alternately positioning the coning tool or punch 64 and the finishing tool or punch 88 in alignment with the forming die 60. Stops 92 are provided on the carriage limiting the aligning positions, and a crank 94 pivotally mounted on the carriage at 96 effects the oscillation of the tool holder 66.

Normally the coning punch or tool 64 is aligned with the forming die 60. Thus, when the cut-off wire section 58 and the washer 70 thereon have been carried into alignment with the central bore 98 in the forming die 60, the coning punch engages the wire section to force it into the central bore 98 as in Fig. 6, the washer holding fixture and shear blade retracting, and the gripper finger 46 dropping as the coning punch moves forward.

The coning punch carries the wire section in to abut a knock-out pin 100 in a bore 98. The knock-out pin is backed up by the rounded upper end of a knock-out lever 102, and this rounded end in turn is backed up by an adjustable stop 104. The entire force exerted by the coning tool or punch on the blank or wire section 58 first must be borne by the knock-out pin 100 and the knock-out lever and stop, but the axial force exerted on the blank by the coning punch expands the diameter thereof so as to form a tight fit in the axial bore 98 of the finishing die, and a portion of the wire is extruded beneath the washer 70 against the outer end of the die 60 as hereinafter will be discussed in greater detail. The washer 70 serves as the back-up member for the major outwardly swaged portion comprising the partially formed head. The tight fit of the wire in the bore and the outwardly swaged portion thereafter take up much of the axial force. The coning punch or tool is provided with a relatively deep axial recess 106 which acts to form a partial head 108 on the wire 58 as will be understood.

The carriage 86 then is withdrawn or retracted, and the oscillating tool holder is oscillated from the position shown in Fig. 10 to the position shown in Fig. 12, thereby bringing the finishing tool or punch 88 into alignment with the finishing die 60. Subsequent movement of the carriage toward the finishing die brings the finishing tool or punch 88 into engagement with the partially formed head 108 to complete formation of the head as is shown in Fig. 11. The finishing punch or tool is provided with a shallow concave recess in its forward face, the recess having a central forward projection 110 for forming a driving slot, such as the well known cruciform slot. The finished bolt blank 112 having the washer 70 permanently assembled beneath the bolt head 114 and about the shank 116 then is ejected by the knock-out pin 100 as is illustrated in Fig. 13, the knock-out lever 102 being pivoted by means such as a punch rod 118 for this purpose.

The finished article as well as the method of producing it as heretofore has been described will be seen more clearly in Figs. 14–19. Thus, in Figs. 14 and 15 the cut off section of wire 58 is shown telescoped with the washer 70. In Figs. 16 and 17, the partially formed head 106 previously referred to is shown. In addition, specifically in Fig. 17, it will be seen that the wire has been expanded outwardly at 118 within the washer center hole by the axial force on the blank, and has swaged outwardly somewhat at 122 beneath the washer against the die face.

In Figs. 18 and 19 the finished article is shown including the head 114 and shank 116. The head is provided with a driving slot 124, preferably of the well known cruciform type, and the material of the shank 116 has been swaged outwardly a greater distance beyond the washer hole 120 and beneath the surface of the washer to form a uniform peripheral abutment 126 firmly holding the washer on the bolt blank 112, the shank being of slightly greater diameter than the wire stock, but being confined by the die 60 to a diameter less than the section 118 and 126. The expansion of the shank at 118 within the washer hole forms a tight fit that precludes relative rotation of the washer and bolt blank. Several advantages are obtained by having the non-rotatable washer permanently fixed beneath the head of the bolt blank, including the provision of a broader bearing surface than can be obtained with ordinary bolt making methods. Furthermore, it provides for a bearing surface having different characteristics than those of the bolt blank. Thus, in Fig. 19 the washer 70 is a hardened washer. It will be understood that the bolt blank cannot be very hard or threads cannot subsequently be rolled on the shank of the bolt blank. It will be observed that in the case of the hardened washer of Fig. 19 the washer is not deformed during the bolt blank forming and assembling operation. In any event, the washer is not deformed from its initial plane.

A modification of the invention is shown in Fig. 20 wherein the washer 70a is a relatively soft washer. It will be seen that during the formation of the head 114a including the slot 124a, the wire not only has deformed outwardly at 118a within the washer hole 120a, accompanied by formation of the protuberance 126a, but that the washer hole itself is deformed outwardly in response to the outward pressure of the wire at 118a. Thus, the inner surface of the washer about the washer hole very nearly assumes a semi-toroidal configuration with the bolt 112a expanded in a complementary manner therein.

Accordingly, the washer 70a is locked on the shank 116a of the bolt blank 112a by the complementary bulge 118a and deformation of the washer hole 120a in addition to being held by the protuberance 126a. The washer again remains flat.

A further modification of the invention is shown in Figs. 21 and 22. In this modification the washer may be either hard or soft, but the washer 70b specifically is illustrated as being hard and as having a square central aperture 120b. Thus, when the wire is expanded within the washer hole, it forms a square section 118b beneath the head 114b. This positively insures against rotation of the bolt blank and washer. A protuberance 126b is formed as heretofore permanently to trap the washer 70b on the shank 116b beneath the head. The head 114b is again shown as having a cruciform driving socket 124b.

The washer 70b also is provided with peripherally disposed locking teeth 128. Since the washer is non-rotatably locked on the bolt blank, and since the washer remains flat and the periphery of the washer in any event extends beyond the periphery of the head 114b, the teeth 128 need only be one-way locking teeth. That is to say, they need extend only in one direction from the plane of the washer to lock against a workpiece. However, in order to facilitate handling of the washers before telescoping of the bolt forming wire, the teeth 128 preferably project in both directions axially of the washer. Thus, the washer can be handled in either of two axially reversed positions without presenting any problems.

From the foregoing it will be apparent that I have herein provided a novel fastener comprising a bolt blank and a washer non-rotatably and permanently associated therewith during formation of the bolt blank in a header. Assembling of the wire being formed into the bolt blank with the washer before severing of the blank and insertion into a die during the formation of the bolt blank eliminates steps from the prior art, resulting in more efficient and rapid production. Various changes in the specific illustrative embodiments of the invention heretofore shown and described will no doubt occur to those skilled in the art and are to be understood as forming a part of my invention insofar as they fall within the spirit and scope of the appended claims.

The invention is claimed as follows:

1. The method of forming a fastener unit which comprises feeding washers successively into a laterally open holder while in spaced axial alignment with an apertured fixed cutting member, feeding a length of wire stock through the aperture in the fixed cutting member and through each washer in succession while held in said holder, engaging the wire stock with a movable cutting member between the fixed cutting member and the washer on the wire stock and thereby severing a length of wire with the washer thereon from the remainder of the wire stock, shifting the holder and the movable cutting member in unison to shift the cut-off length of wire and washer to a position between a wire-confining die and a head-forming punch with the holder maintaining the washer in predetermined position on the cut-off length of wire, and relatively moving the punch and die toward one another axially of the cut-off length of wire and into engagement therewith, with simultaneous retraction of the movable cutting member and holder to release the washer through the lateral opening in the holder, whereby to upset one end of the cut-off length of wire to form a head thereon at one side of the washer.

2. The method of forming a fastener unit in accordance with claim 1, wherein the length of wire is expanded simultaneously with upsetting in the vicinity of the washer and at the opposite side thereof to permanently secure the washer thereon.

3. The method of forming a fastener unit in accordance with claim 1, wherein the end of the cut-off length of wire is positioned against a knock-out plunger within the die, and wherein the knock-out plunger is shifted to remove the assembled washer and cut-off length of wire from the die upon withdrawal of the punch.

4. The method of forming a fastener unit which comprises feeding washers successively into a laterally open holder while in spaced axial alignment with an apertured fixed cutting member, feeding a length of wire stock through the aperture in the fixed cutting member and through each washer in succession while held in said holder, engaging the wire stock with a movable cutting member between the fixed cutting member and the washer on the wire stock and thereby severing a length of wire with the washer thereon from the remainder of the wire stock, shifting the holder and the movable cutting member in unison to shift the cut-off length of wire and washer to a position with the cut-off length of wire in axial alignment with a wire-confining die and a preliminary head-forming punch with the holder maintaining the washer in predetermined position on the cut-off length of wire, relatively moving the preliminary punch and die toward one another axially of the cut-off length of wire and into engagement therewith, with simultaneous retraction of the movable cutting member and holder to release the washer through the lateral opening in the holder, whereby to initially upset one end of the cut-off length of wire, and thereafter withdrawing the preliminary punch and positioning a finishing head-forming punch in alignment with the upset end of the cut-off length of wire and relatively moving the finishing punch and die toward one another to further deform the upset end of the wire into a finished head.

References Cited in the file of this patent

UNITED STATES PATENTS

| | | |
|---|---|---|
| 665,725 | Beker | Jan. 8, 1901 |
| 681,845 | Davenport | Sept. 3, 1901 |
| 1,268,862 | MacMillan | June 11, 1918 |
| 1,382,052 | Birrell | June 21, 1921 |
| 1,435,586 | Collette | Nov. 14, 1922 |
| 1,688,423 | Jardine | Oct. 23, 1928 |
| 2,228,284 | Olson | Jan. 14, 1941 |
| 2,257,959 | Hoppenstand | Oct. 7, 1941 |
| 2,609,550 | Phipard | Sept. 9, 1952 |
| 2,662,597 | Ballard | Dec. 15, 1953 |

FOREIGN PATENTS

| | | |
|---|---|---|
| 364,818 | Germany | Dec. 1, 1922 |